(12) United States Patent
Isley

(10) Patent No.: US 7,832,508 B2
(45) Date of Patent: *Nov. 16, 2010

(54) WALKING BEAM SUSPENSION FOR TRACKED VEHICLE

(75) Inventor: Reggald E. Isley, Grande Prairie (CA)

(73) Assignee: Risley Enterprises Ltd., Grande Prairie, CA (US)

( * ) Notice: Subject to any disclaimer, the term of this patent is extended or adjusted under 35 U.S.C. 154(b) by 510 days.

This patent is subject to a terminal disclaimer.

(21) Appl. No.: 11/570,882

(22) PCT Filed: Mar. 29, 2005

(86) PCT No.: PCT/CA2005/000455

§ 371 (c)(1),
(2), (4) Date: Apr. 24, 2008

(87) PCT Pub. No.: WO2005/123489

PCT Pub. Date: Dec. 29, 2005

(65) Prior Publication Data

US 2008/0210478 A1 Sep. 4, 2008

Related U.S. Application Data

(63) Continuation of application No. 10/870,068, filed on Jun. 18, 2004, now Pat. No. 6,951,260.

(51) Int. Cl.
*B60G 5/00* (2006.01)
*B62D 55/00* (2006.01)

(52) U.S. Cl. .................... 180/9.54; 280/124.178; 280/681

(58) Field of Classification Search .......... 180/9.1, 180/9.46, 9.5, 9.54; 280/124.177, 124.178, 280/677, 681, 682

See application file for complete search history.

(56) References Cited

U.S. PATENT DOCUMENTS

| 3,618,971 | A | * | 11/1971 | Wragg | 280/681 |
|---|---|---|---|---|---|
| 4,000,914 | A | * | 1/1977 | Wragg | 280/682 |
| 4,061,361 | A | * | 12/1977 | Felburn | 280/681 |
| 4,357,032 | A | * | 11/1982 | Kenyon | 280/681 |

(Continued)

FOREIGN PATENT DOCUMENTS

CA 891396 1/1972

(Continued)

OTHER PUBLICATIONS

International Search Report for PCTCA2005/00455, International Searching Authority, Aug. 22, 2005, pp. 1-3.

*Primary Examiner*—Lesley D Morris
*Assistant Examiner*—Marc A Scharich
(74) *Attorney, Agent, or Firm*—Oyen Wiggs Green & Mutala LLP

(57) ABSTRACT

A suspension for a tracked vehicle includes a bogie wheel assembly which has a pair of bogie wheels mounted to a walking beam. The walking beam is coupled to a body of the vehicle by a transversely-extending arm. The arm may be coupled to the body by a spherical bearing which permits angular rotation in at least two directions. The walking beam is connected to the body by shear members arranged in an inverted-V configuration. The shear members may be elastomeric springs.

28 Claims, 10 Drawing Sheets

U.S. PATENT DOCUMENTS

| | | | |
|---|---|---|---|
| 4,519,654 A * | 5/1985 | Satzler et al. | 305/138 |
| 4,789,181 A * | 12/1988 | Baxter | 280/681 |
| 5,899,543 A | 5/1999 | Lykken et al. | |
| 6,234,590 B1 * | 5/2001 | Satzler | 305/132 |
| 6,585,286 B2 * | 7/2003 | Adema et al. | 280/677 |
| 6,951,260 B1 * | 10/2005 | Isley | 180/9.54 |
| 7,234,723 B2 * | 6/2007 | Sellers | 280/686 |

FOREIGN PATENT DOCUMENTS

| | | |
|---|---|---|
| GB | 805417 | 12/1958 |
| SU | 1595700 A1 | 9/1990 |

\* cited by examiner

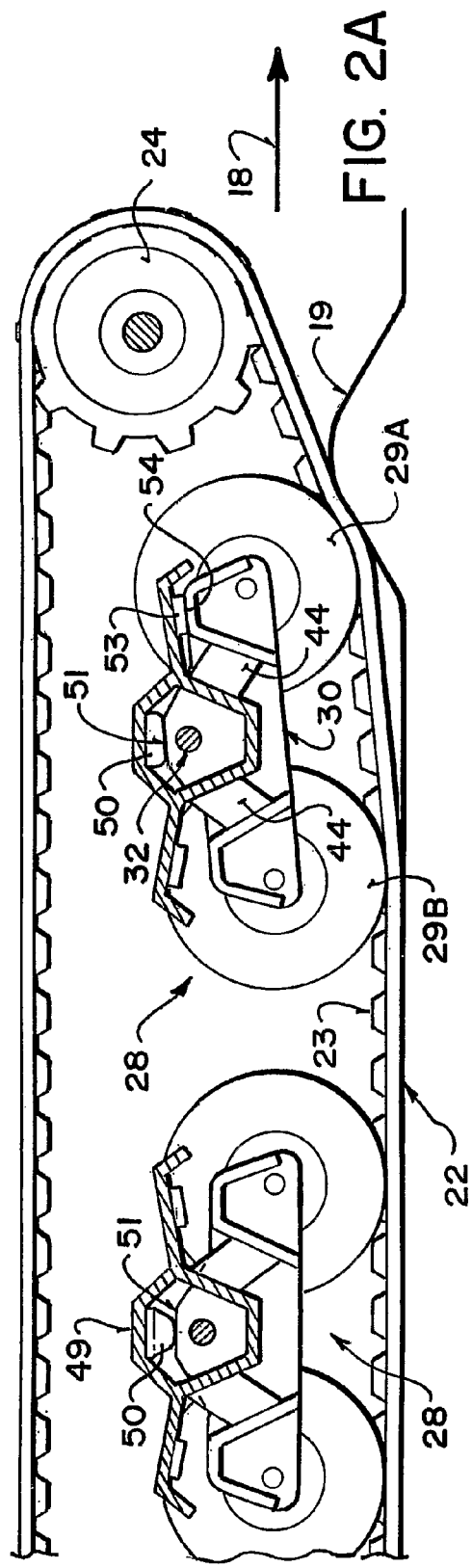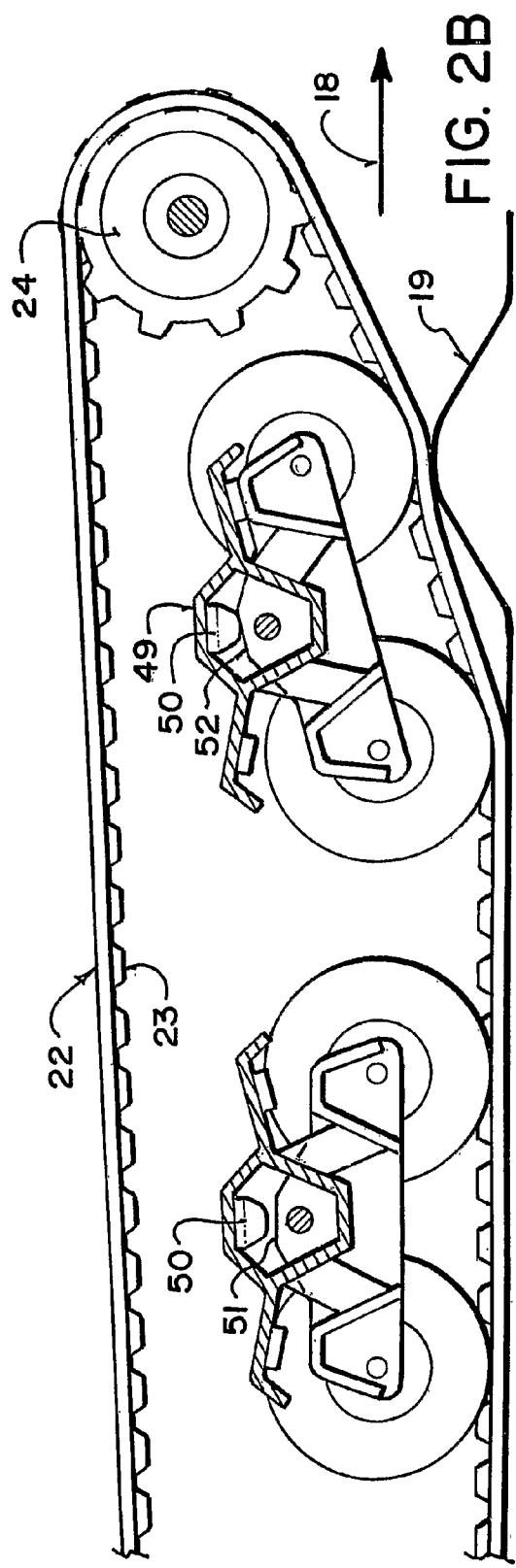

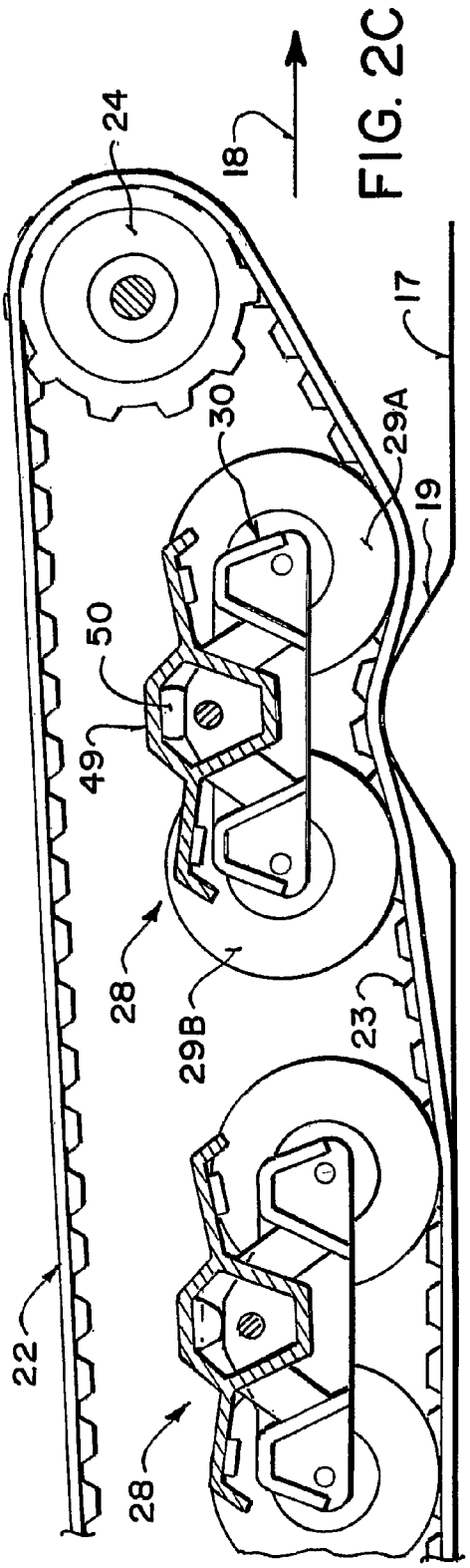
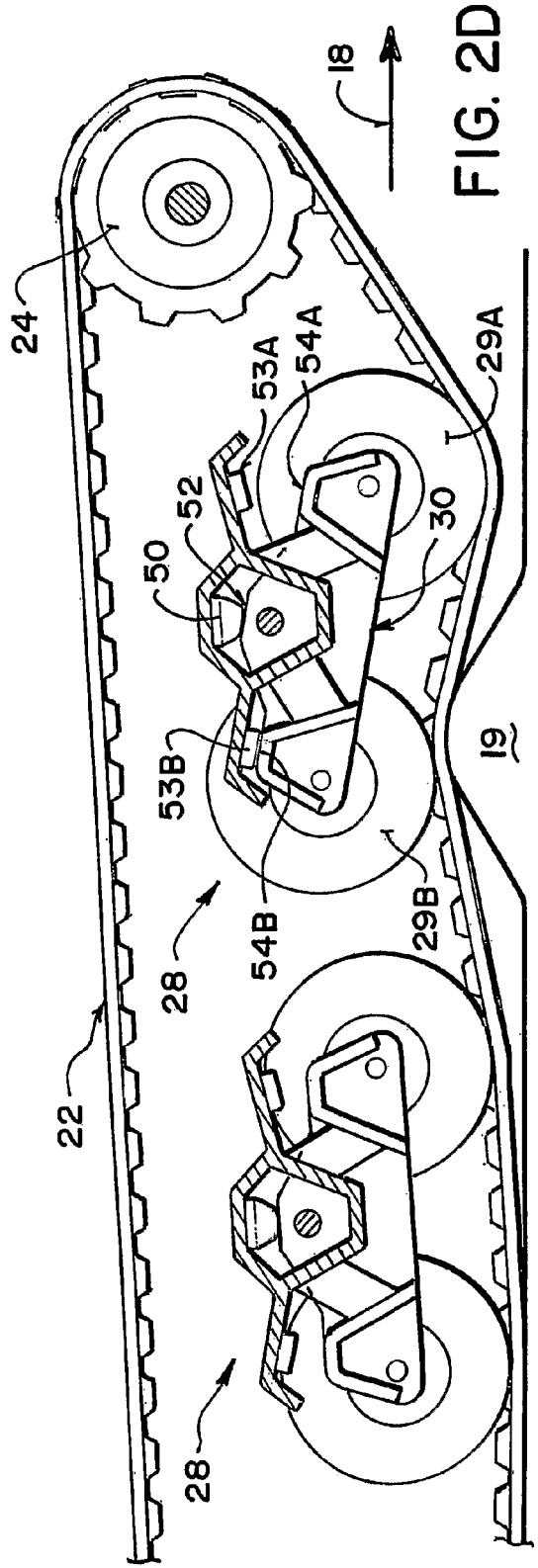

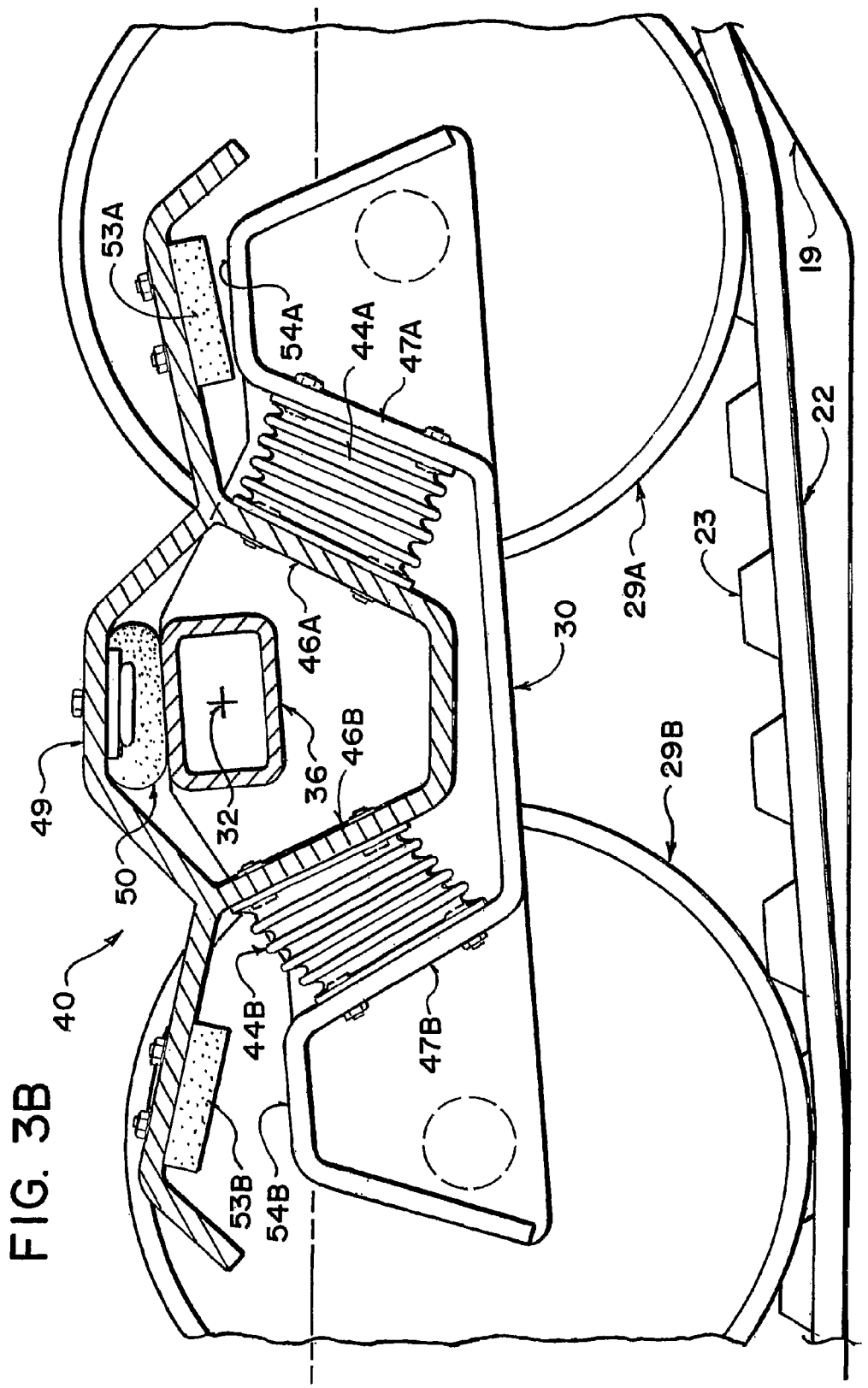

WALKING BEAM SUSPENSION FOR TRACKED VEHICLE

CROSS REFERENCE TO RELATED APPLICATION

This application claims the benefit of the filing date of U.S. patent application Ser. No. 10/870,068 filed 18 Jun. 2004.

TECHNICAL FIELD

The invention relates to walking beam vehicle suspensions. Specific embodiments of the invention relate to suspensions for tracked vehicles having bogie wheels supported on walking beams.

BACKGROUND

Many vehicles are provided with track undercarriages. Some examples are various military vehicles, excavators, bulldozers, off-road industrial vehicles such as feller bunchers, tree delimbers and so on. Appropriately-designed tracked vehicles can have advantages in cases where good traction, good flotation and/or low ground pressure are required. In a typical track system, an endless loop of track passes around a pair of idlers. Bogie wheels or rollers bear against the track between the idlers to transfer weight of the vehicle to the ground.

There is a need for cost effective track systems which permit the bogie wheels to move to accommodate uneven terrain under the tracks.

SUMMARY OF THE INVENTION

One aspect of this invention provides a walking beam suspension mechanism for use in a tracked vehicle. The suspension mechanism comprises a walking beam mounted at an outer location on a transversely-extending arm. The arm is coupled to a body of the vehicle at an inner location. The walking beam is pivotal about a transverse axis. First and second elastically shearable members are coupled between the body of the vehicle and the walking beam. The elastically shearable members arranged in an inverted-V configuration. First and second bogie wheels are coupled to the walking beam at longitudinally spaced apart locations. A vehicle according to the invention may have several such suspension mechanisms to support each of two or more tracks.

Another aspect of the invention provides a tracked vehicle comprising: a body; and a longitudinally extending loop of track disposed on either side of the body. Each of the loops of track passes around at least first and second idlers and is supported by at least one suspension mechanism. The suspension mechanism comprises: a walking beam mounted at an outer location on a transversely-extending arm, first and second elastically shearable members coupled between the body of the vehicle and the walking beam; and, first and second bogie wheels coupled to the walking beam at longitudinally spaced apart locations. The arm is coupled to the body of the vehicle at an inner location. The walking beam is pivotal about a transverse axis. The elastically shearable members are arranged in an inverted-V configuration.

Further aspects of the invention and features of specific embodiments of the invention are described below.

BRIEF DESCRIPTION OF THE DRAWINGS

In drawings which illustrate non-limiting embodiments of the invention,

FIGS. 2A through 2D are sectional elevation views of two walking beam assemblies of the track system of FIG. 1 as it travels over an obstacle;

FIGS. 3A, 3B and 3C are detailed sectional views of a walking beam assembly of the track system of FIG. 1 looking outward in the plane 3-3 indicated in FIG. 5 respectively in a neutral position; a partially rotated position; and a fully rotated position;

FIG. 5A is an elevational longitudinal section through a bearing assembly of the walking beam assembly in the plane 5A-5A indicated in FIG. 5;

DESCRIPTION

Throughout the following description, specific details are set forth in order to provide a more thorough understanding of the invention. However, the invention may be practised without these particulars. In other instances, well known elements have not been shown or described in detail to avoid unnecessarily obscuring the invention. Accordingly, the specification and drawings are to be regarded in an illustrative, rather than a restrictive, sense.

This invention relates to walking beam suspension systems wherein a walking beam, which is pivotal about an axis, is mounted to a vehicle structure by way of one or more bolsters. The bolsters are members or assemblies which deform in shear more readily than they can be compressed. In some embodiments of the invention the bolsters comprise elastomer springs of the types used in the rubber suspension systems available from Hendrickson International of Woodridge Ill. under the trademarks HAULMAAX™ and HN Series™.

Figure 1:
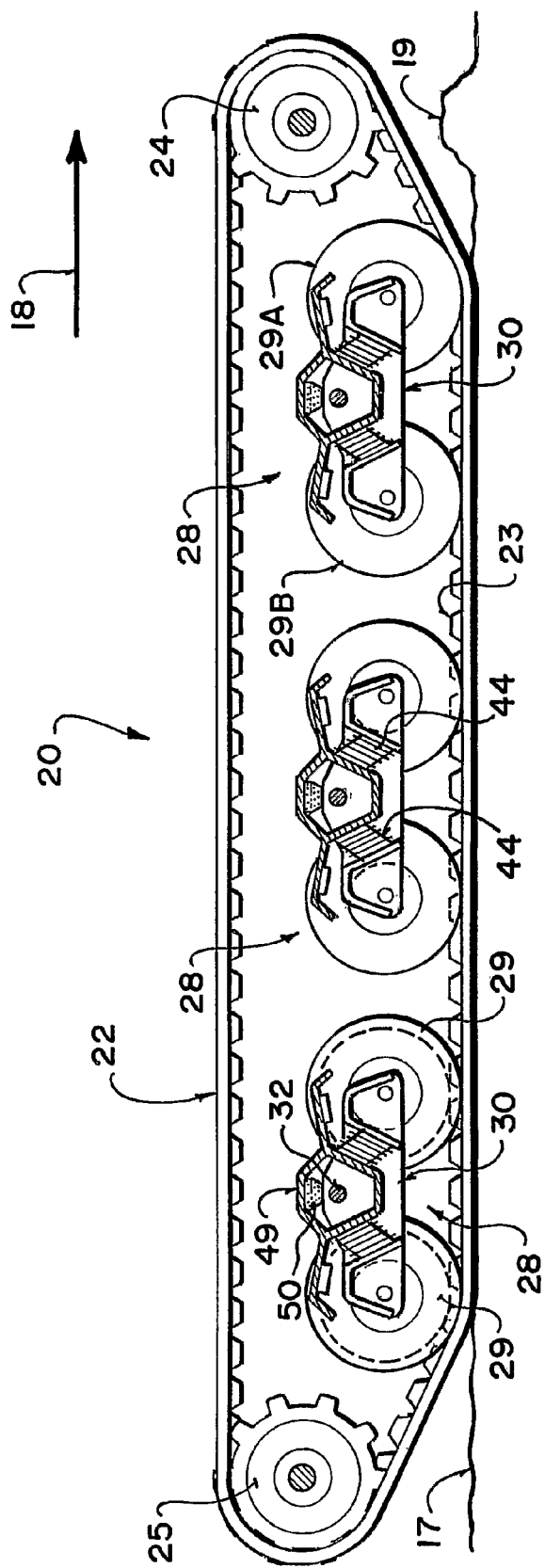
FIG. 1 is a sectional elevation view looking outward in the plane 1-1 indicated in FIG. 4 of a track system according to the invention.

FIG. 1 shows a track system 20 according to one embodiment of the invention. Track system 20 comprises an endless track loop 22 which passes around idlers 24 and 25. One or both of idlers 24 and 25 are driven by an engine, transmission, hydraulic or electric motors or some other suitable driving means. Idlers 24 and 25 are supported on a carbody 26. A number of walking beam assemblies 28 include bogie wheels 29 which bear against a lower portion of track 22. Track 22 includes a guide 23 which engages with bogie wheels 29.

In FIG. 1, system 20 is siting on a level grade 17. Each walking beam assembly 28 is in a neutral normally loaded configuration.

Each walking beam assembly 28 comprises a walking beam 30. A bogie wheel 29 is mounted for rotation at either end of walking beam 30. Each walking beam 30 is mounted so that it can pivot around an axis 32. Axis 32 is substantially perpendicular to bogie wheels 29 and to a plane of guide 23 so that pivoting of walking beam 30 about axis 32 does not cause bogie wheels 29 to move significantly inward or outward relative to the plane of guide 23.

FIGS. 2A through 2D show more detailed views of a walking beam assembly 28 of a vehicle driving over an obstacle 19. For convenience, the direction 18 in which the vehicle is travelling will be called "forward". Walking beam assembly 28 has a front bogie wheel 29A mounted at a forward end of walking beam 30 and a rear bogie wheel 29B mounted at the rear end of walking beam 30. When front bogie wheel 29A reaches the part of track 22 which is over obstacle 19 then walking beam 30 pivots counterclockwise (in the frame of reference of FIG. 2B) to allow front bogie wheel 29A to pass over obstacle 19. When rear bogie wheel 29B reaches the part of track 22 which is over obstacle 19 then walking beam 30 pivots clockwise (in the frame of reference of FIGS. 2C and 2D) to allow rear bogie wheel 29B to pass over the obstacle.

Figure 4:
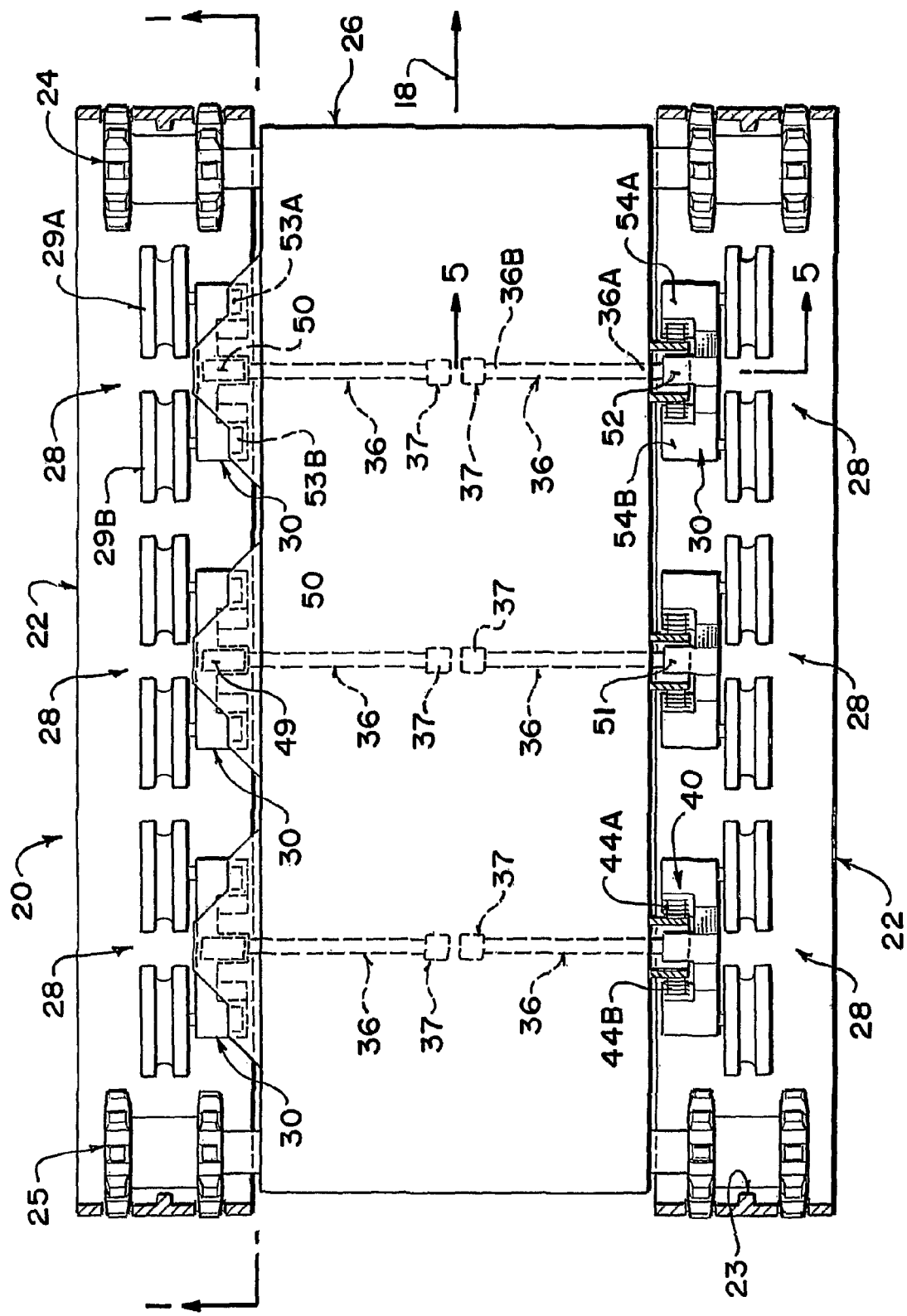
FIG. 4 is a top plan view of a vehicle incorporating a number of walking beam assemblies substantially as shown in FIG. 1.
Figure 5:
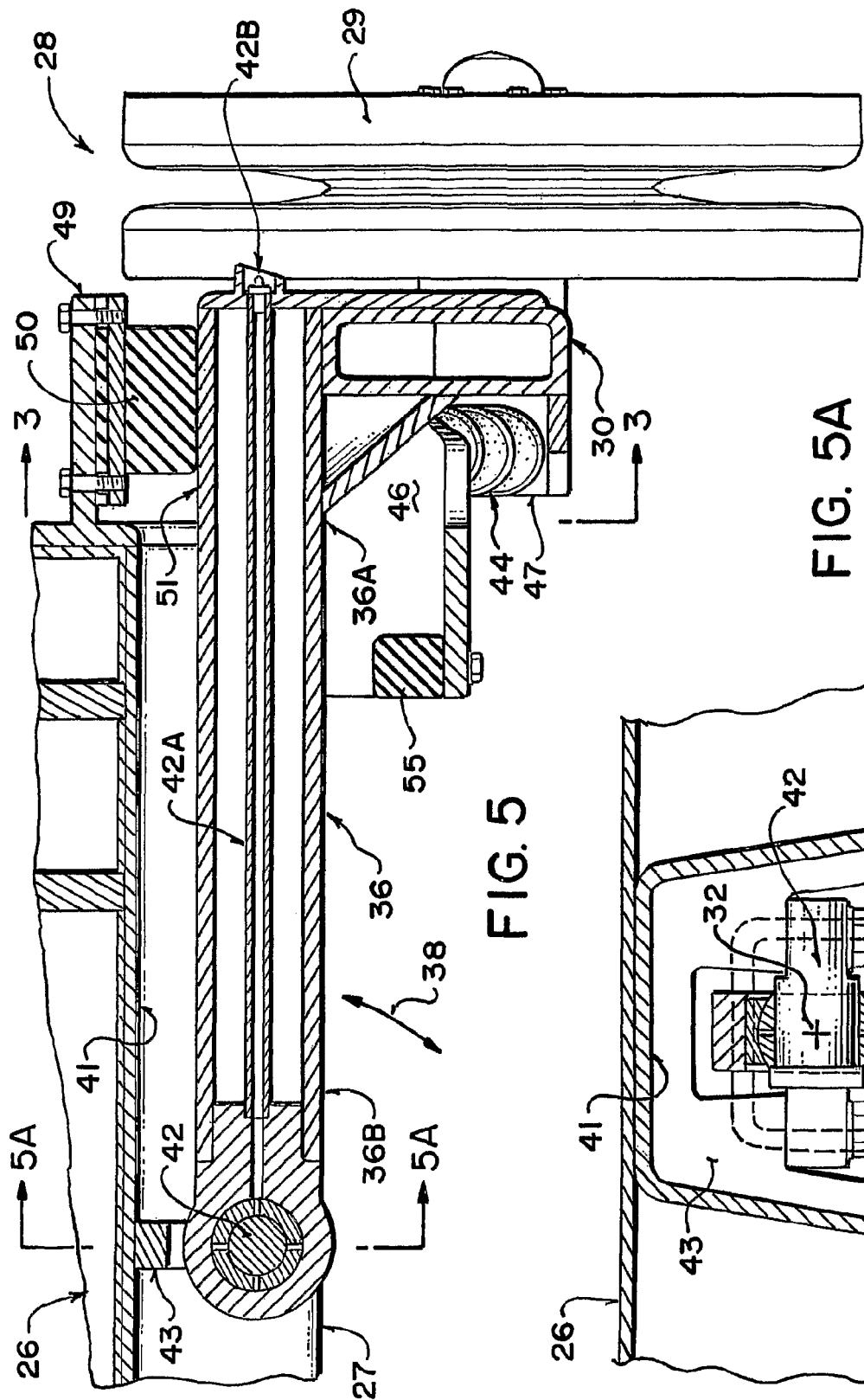
FIG. 5 is an elevational transverse section through a walking beam assembly.
Figure 6:
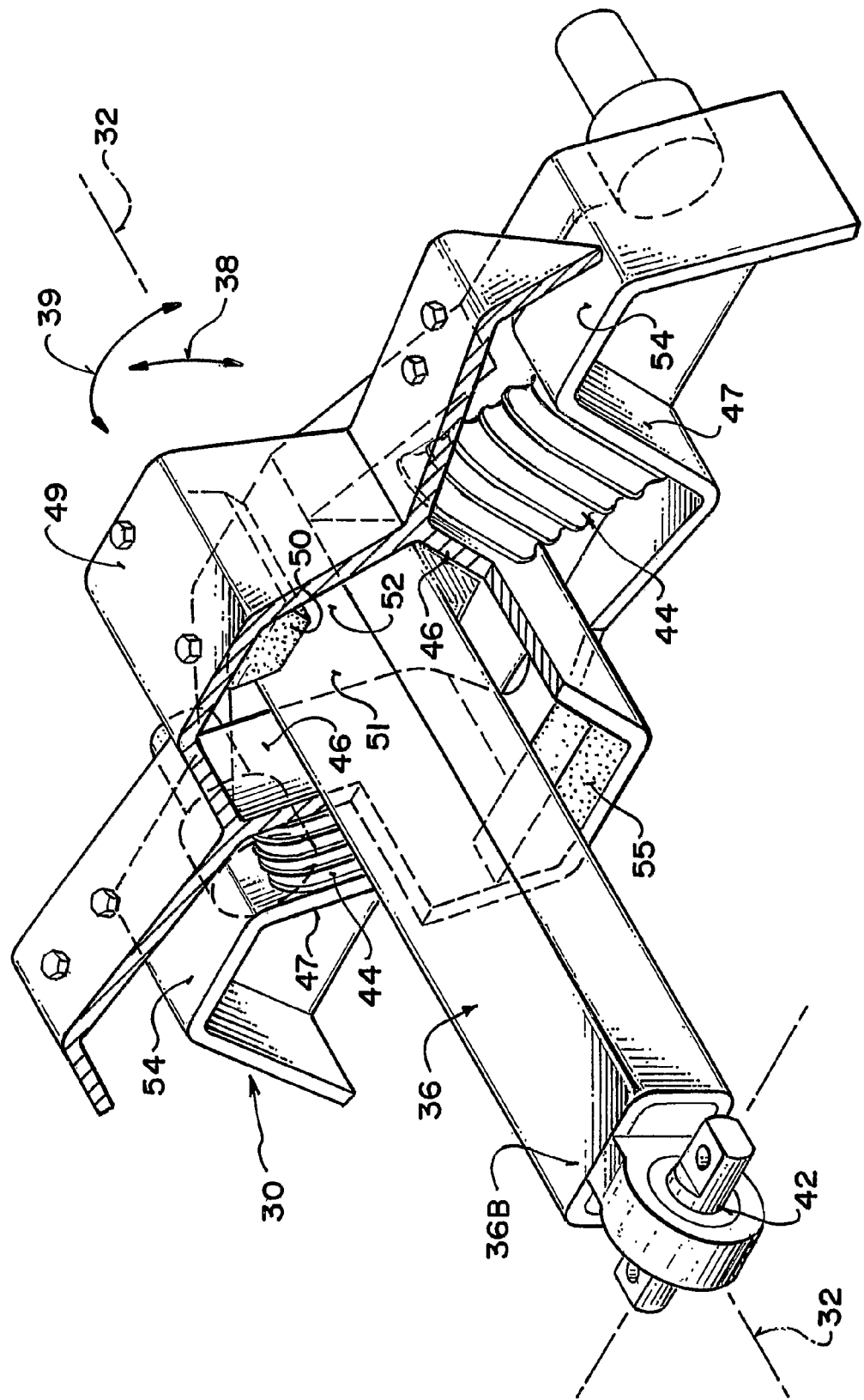
FIG. 6 is an isometric view of the walking beam assembly.

FIGS. 3A to 3C, 5 and 6 illustrate how walking beams 30 are supported. As seen in FIG. 5, walking beam 30 is mounted to an outer end 36A of a transversely-extending arm 36. An inward end 36B of arm 36 is coupled to carbody 26 by means of a coupling 37 (or combination of couplings—see FIG. 4), which permits outer end 36A to move vertically, as indicated by arrow 38, and also permits walking beam 30 to rotate about axis 32. In the illustrated embodiment, arm 36 comprises a rectangular tube and is rigidly affixed to walking beam 30. Arm 36 and walking beam 30 can rotate together as indicated by arrow 39 (FIG. 5A).

Coupling 37 may, for example, comprise a spherical bearing as shown in FIG. 5A. In the illustrated embodiment, the spherical bearing is supported on as shaft 42 which is mounted to a mounting block 43 on the underside of carbody 26. A tube 42A carries a lubricant (e.g. grease) from a fitting 42B on walking beam 30.

In the illustrated embodiment, arms 36 are located in channels 41 which are recessed from a lower surface 27 of carbody 26. Channels 41 provide some protection against arms 36 becoming snagged on rocks, stumps or other obstacles.

Walking beam 30 is coupled to carbody 26 by a suspension 40. Suspension 40 comprises elastomeric springs 44A and 44B (collectively, elastomeric springs 44). Elastomeric springs 44A and 44B are of a type which can be deformed in shear with lower force than they can be deformed in compression. For example, in some embodiments, elastomeric springs 44A and 44B may comprise HAULMAAX™ 460 bolster springs available from Hendrickson International of Woodridge Ill. Elastomeric springs 44 both support loads applied to walking beam assembly 28 and provide resistance to the rotation of walking beam 30.

Elastomeric spring 44A is mounted between a support plate 46A mounted to carbody 26 and a support plate 47A mounted to walking beam 30. Elastomeric spring 44B is mounted between a support plate 46B mounted to carbody 26 and a support plate 47B mounted to walking beam 30.

Figure 3A:
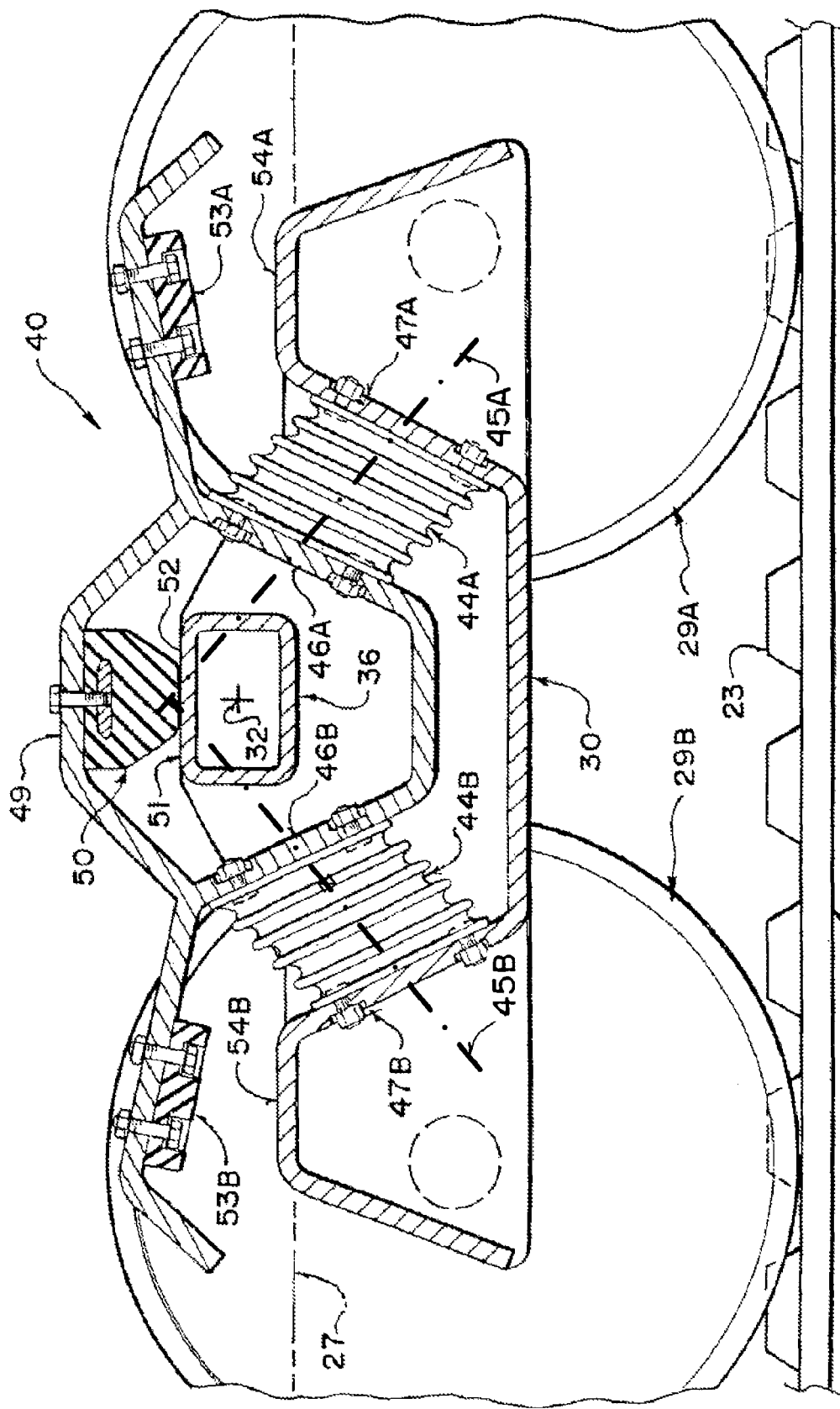
Figure 3C:
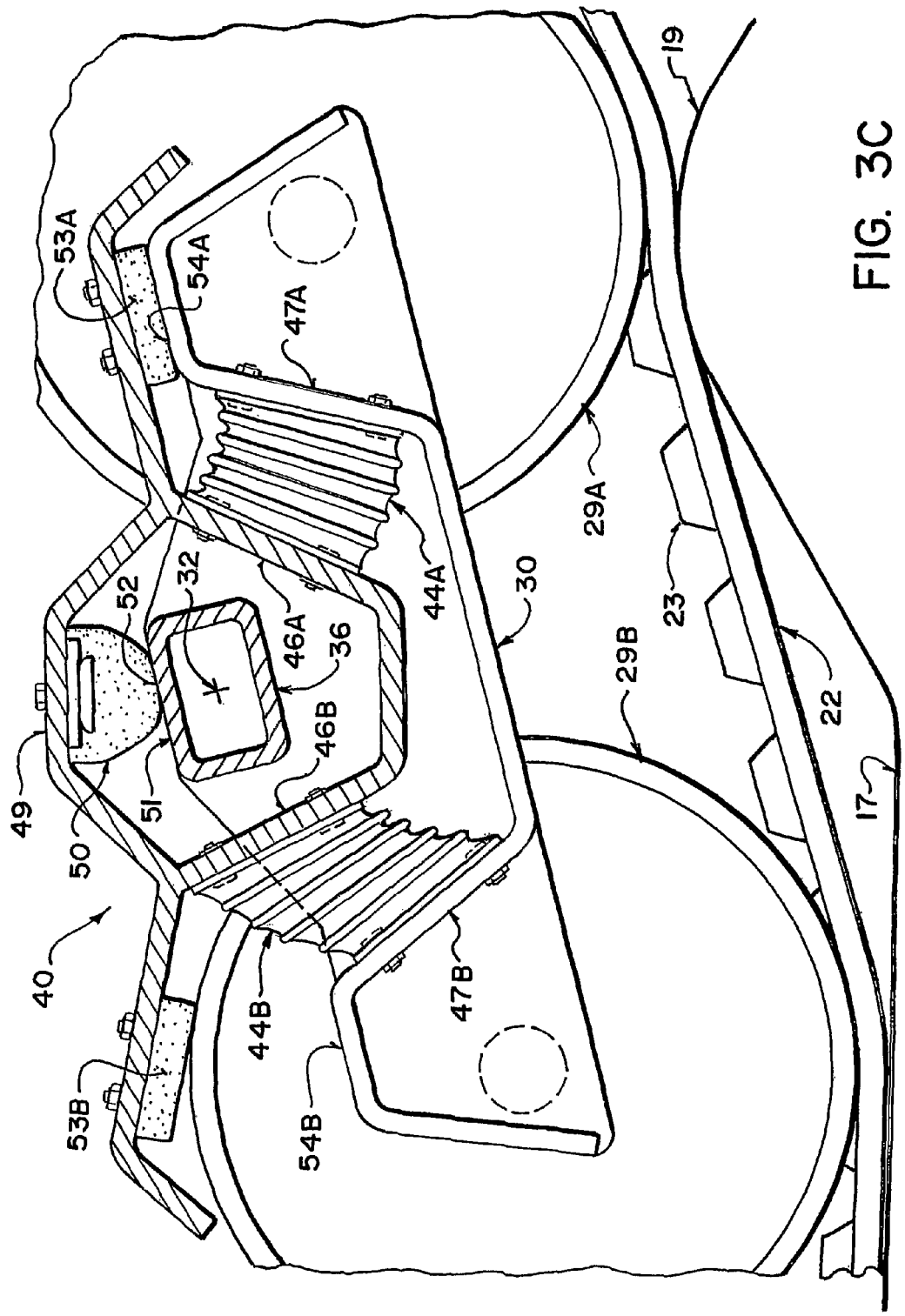

Elastomeric springs 44 are mounted in an inverted V configuration as shown in FIG. 3A. With this configuration, elastomeric springs 44 can shear to permit walking beam 30 to rotate about axis 32. In the illustrated embodiment, elastomeric springs are symmetrical about a vertical axis passing through axis 32. In some embodiments the centerlines 45A and 45B (collectively centerlines 45) of elastomeric springs 44 are at an angle (an included angle) of at least about 70 degrees. In some embodiments the centerlines 45 of elastomeric springs 44 are at an included angle not exceeding about 130 degrees (where the included angle is measured between centerlines 45 of elastomeric springs 44). In typical embodiments the included angle is in the range of about 80 to 120 degrees, sometimes in the range of 90 to 120 degrees.

In a prototype embodiment of the invention plates 46 are at an angle of about 50 to 55 degrees to one another.

As shown in FIG. 3A, the ends of each of elastomeric springs 44 may be offset relative to one another. In the illustrated embodiment, end plates 46 and 47 are parallel to one another when walking beam assembly 28 is in a neutral configuration, and the offset is such that the lower ends of elastomeric springs 44 are displaced downwardly relative to a line drawn perpendicularly to the plate 46 at the upward side of elastomeric spring 44.

A geometry for use with a particular set of elastomeric springs 44 may be determined empirically by varying the positions of mounting plates 46 and 47 until a geometry is achieved such that, when walking beam assembly 28 is carrying a desired load, the application of additional force in a vertical direction to either one of bogie wheels 29 causes walking beam 30 to rotate around axis 32. When this is achieved, walking beam 30 can rotate while axis 32 remains centered between plates 47.

When walking beam assembly 28 is completely unloaded, the weight of walking beam 30 and bogie wheels 29 are supported by elastomeric springs 44. As weight is applied to walking beam assembly 28, aim 36 pivots upwardly in coupling 37 as indicated by arrow 38. Elastomeric springs 44 increasingly resist this motion as they become slightly compressed and shear.

As seen in FIG. 3A, suspension 40 includes a bumper 50. In the illustrated embodiment, bumper 50 is affixed to a plate 49 which projects from carbody 26. When a walking beam assembly 28 is sufficiently loaded, bumper 50 bears against a surface 52 of a portion 51 of walking beam 30. Bumper 50 may comprise a pad of rubber or another suitable resiliently compressible material. In the less desirable alternative, bumper 50 could comprise a spring. Bumper 50 limits the travel of walking beam 30 in the upward direction of arrow 38. In some embodiments, when walking beam assembly 28 is carrying a normal load, surface 52 bears against bumper 50. In some of the drawings, for example FIG. 3B, the compression of bumper 50 has been exaggerated.

Stops 53A and 53B may be provided to limit the rotation of walking beam 50 to be within a desired angular range. In the illustrated embodiment, stops 53A and 53B limit travel by abutting against corresponding surfaces 54A and 54B of walking beam 30. In a prototype embodiment of the invention, walking beam 30 can rotate approximately 12 degrees in either direction before engaging one of stops 53A and 53B.

A support 55 (see FIG. 5) may be provided to prevent walking beam assembly 28 from dropping too far when it is completely unloaded or when it is forced downward for some reason.

Figure 7:
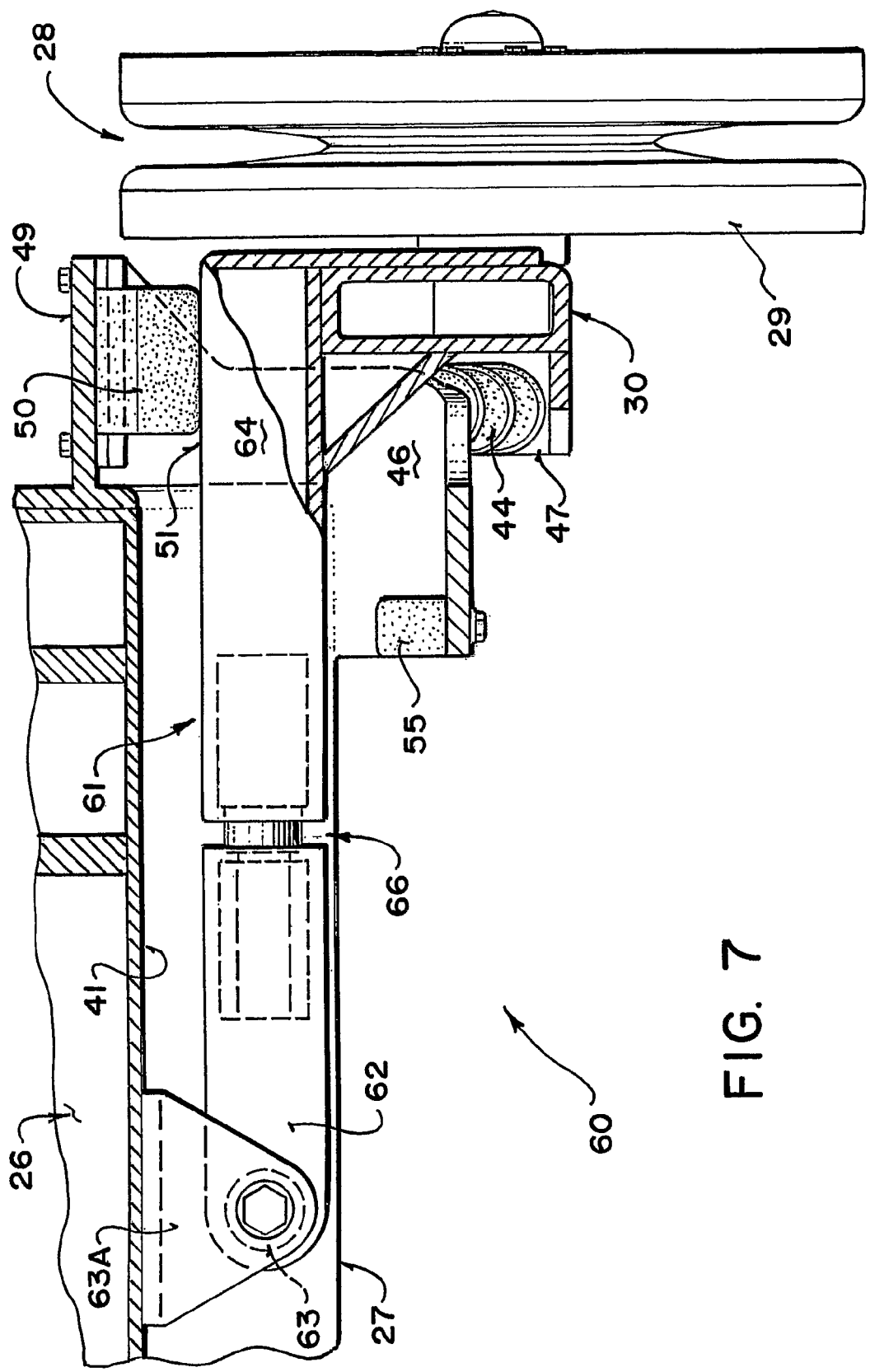
FIG. 7 is a transverse section through a walking beam assembly according to an alternative embodiment of the invention.

FIG. 7 illustrates a walking beam suspension system 60 according to an alternative embodiment of the invention. In system 60, walking beam 30 and bogie wheels 29 are carried at an outer end of a modified arm 61. Arm 61 comprises an inner section 62 and an outer section 64 connected by a rotatable coupling 66. An inner end of inner section 62 pivotally mounted to carbody 26 at a pivot coupling 63 supported by a lug 63A.

In suspension system 60, inner part 62 can pivot up or down relative to carbody 26 as indicated by arrow 67. Outer section 64 can rotate relative to inner section 62 at coupling 66 to permit walking beam 30 to rotate about axis 32.

Where a component (e.g. a coupling, assembly, component, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

In the illustrated embodiments, one elastomeric spring 44 is provided on each side of walking beam 30. In cases where additional load capacity is desired, additional elastomeric springs 44 may be provided in parallel with springs 44A and 44B.

While elastomeric springs of the general type described above have been found to work well in some suspension assemblies according to the invention, other types of spring members which elastically deform under shear may be used in their place. For example, air bags could be used for elastomeric springs 44.

Instead of including a mechanical coupling that permits rotation of walking beam 30, arm 36 could comprise a torsion beam that can twist enough to permit the walking beam to pivot and bend enough to let the walking beam move up and down. In this case the inner end of arm 36 could be mounted rigidly to carbody 26.

Accordingly, the scope of the invention is to be construed in accordance with the substance defined by the following claims.

What is claimed is:

1. A walking beam suspension for a tracked vehicle, the suspension comprising:
   a walking beam mounted at an outer location on a transversely-extending arm, the arm coupled to a body of the vehicle at an inner location, the walking beam pivotal about a transverse axis;
   first and second elastically sharable members coupled between the body of the vehicle and the walking beam, the elastically shearable members each having a centerline and being shearable transversely relative to the centerline wherein the centerlines of the elastically shearable members are arranged to form an inverted-V; and,
   first and second bogie wheels coupled to the walking beam at longitudinally spaced-apart locations.

2. A walking beam suspension according to claim 1 wherein the first and second elastically shearable members are respectively in front of and behind the arm.

3. A walking beam suspension according to claim 1 wherein an inner end of the arm is pivotally mounted to the body at a pivot coupling.

4. A walking beam suspension according to claim 3 wherein the pivot coupling is located approximately at a longitudinal centerline of the body.

5. A walking beam suspension according to claim 4 wherein the pivot coupling comprises a spherical ball coupling.

6. A walking beam suspension according to claim 5 wherein the walking beam is rigidly affixed to the arm.

7. A walking beam suspension according to claim 4 comprising a rotational coupling located to permit the walking beam to rotate about the transverse axis relative to an inner end of the arm.

8. A walking beam suspension according to claim 1 wherein the elastically shearable members comprise elastomer springs.

9. A walking beam suspension according to claim 1 comprising a bumper attached to the body and located centrally over the walking beam.

10. A walking beam suspension according to claim 1 wherein the first and second elastically shearable members each comprise a pair of elastically shearable members mounted in parallel to one another.

11. A walking beam suspension according to claim 1 wherein an included angle of the centerlines is in the range of 80 degrees to 120 degrees.

12. A walking beam suspension according to claim 1 wherein an included angle of the centerlines is at least 80 degrees.

13. A walking beam suspension according to claim 1 wherein an included angle of the centerlines does not exceed 130 degrees.

14. A walking beam suspension according to claim 1 wherein the walking beam is supported relative to the body exclusively by the first and second elastically shearable members and the arm.

15. A walking beam suspension according to claim 1 wherein the bogie wheels are each grooved to receive a track guide.

16. A tracked vehicle comprising:
   a body;
   a longitudinally extending loop of track disposed on either side of the body;
   each of the loops of track passing around at least first and second rollers and supported by at least one walking beam assembly, the walking beam assembly comprising:
   a walking beam mounted at an outer location on a transversely-extending arm, the arm coupled to the body of the vehicle at an inner location, the walking beam pivotal about a transverse axis;
   first and second elastically shearable members coupled between the body of the vehicle and the walking beam, the elastically shearable members each having a centerline and being shearable transversely relative to the centerline wherein the centerlines of the elastically shearable members are arranged to form an inverted-V; and,
   first and second bogie wheels coupled to the walking beam at longitudinally spaced apart locations.

17. A vehicle according to claim 16 wherein, in each of the walking beam assemblies, the first and second elastically shearable members are respectively in front of and behind the arm.

18. A vehicle according to claim 16 wherein, in each of the walking beam assemblies, an inner end of the arm is pivotally mounted to the body at a pivot coupling.

19. A vehicle according to claim 18 wherein, in each of the walking beam assemblies, the pivot coupling is located approximately at a longitudinal centerline of the body.

20. A vehicle according to claim 19 wherein, in each of the walking beam assemblies, the pivot coupling comprises a spherical ball coupling.

21. A vehicle according to claim 20 wherein, in each of the walking beam assemblies, the walking beam is rigidly affixed to the arm.

22. A vehicle according to claim 16 wherein the elastically shearable members each comprise an elastomer spring.

23. A vehicle according to claim 16 wherein each of the walking beam assemblies comprises a bumper attached to the body and located centrally over the walking beam.

24. A vehicle according to claim 16 wherein an included angle of the centerlines of the first and second elastically shearable members is in the range of 80 degrees to 120 degrees.

25. A vehicle according to claim 16 wherein an included angle of the centerlines of the first and second elastically shearable members is at least 70 degrees.

26. A vehicle according to claim 16 wherein an included angle of the centerlines of the first and second elastically shearable members does not exceed 130 degrees.

27. A vehicle according to claim 16 comprising at least two of the bogie wheel assemblies supporting each of the track loops.

28. A vehicle according to claim 16 wherein the bogie wheels are each grooved to receive a track guide of a respective one of the track loops.

* * * * *